United States Patent
Navarro-Dimm et al.

(10) Patent No.: US 12,452,277 B2
(45) Date of Patent: Oct. 21, 2025

(54) ENTERPRISE APPLICATION SHIELD SYSTEMS AND METHODS

(71) Applicant: AT&T Intellectual Property I, L.P., Atlanta, GA (US)

(72) Inventors: Jason E. Navarro-Dimm, Cumming, GA (US); Brenda Pratt, Wylie, TX (US); Hussein Fareed, Milton, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 160 days.

(21) Appl. No.: 18/510,155

(22) Filed: Nov. 15, 2023

(65) Prior Publication Data

US 2025/0159006 A1 May 15, 2025

(51) Int. Cl.
 *H04L 9/40* (2022.01)
(52) U.S. Cl.
 CPC ...... *H04L 63/1425* (2013.01); *H04L 63/1416* (2013.01)
(58) Field of Classification Search
 CPC .. H04L 63/1425; H04L 63/1416; G06F 21/55
 See application file for complete search history.

(56) References Cited

U.S. PATENT DOCUMENTS

| | | | | |
|---|---|---|---|---|
| 8,196,200 B1 * | 6/2012 | Yeo | ............ | H04L 63/1466 713/161 |
| 8,566,919 B2 * | 10/2013 | Meisel | ............ | H04L 63/0218 709/224 |
| 10,652,254 B2 * | 5/2020 | Kuperman | ............ | G06N 3/04 |
| 10,693,901 B1 * | 6/2020 | Chan | ............ | H04L 67/02 |
| 2003/0051142 A1 * | 3/2003 | Hidalgo | ............ | H04L 63/04 713/176 |
| 2006/0059550 A1 * | 3/2006 | Kausik | ............ | G06Q 20/027 726/11 |
| 2008/0222717 A1 * | 9/2008 | Rothstein | ............ | H04L 63/1416 726/14 |
| 2008/0263358 A1 * | 10/2008 | Alme | ............ | H04L 63/14 713/176 |
| 2009/0282480 A1 * | 11/2009 | Lee | ............ | G06F 21/55 717/130 |
| 2009/0328187 A1 * | 12/2009 | Meisel | ............ | H04L 63/0227 726/13 |

(Continued)

OTHER PUBLICATIONS

Thang, Nguyen Manh. "Improving efficiency of web application firewall to detect code injection attacks with random forest method and analysis attributes HTTP request." Programming and Computer Software 46.5 (2020): 351-361.*

(Continued)

*Primary Examiner* — Jimmy H Tran
(74) *Attorney, Agent, or Firm* — Guntin & Gust, PLC; Miyoung Shin

(57) ABSTRACT

Aspects of the subject disclosure may include, for example, enterprise application shield systems and methods for performing a sequence of security checks as to an incoming HTTP request and forwarding the HTTP request to a target system upon detection of an absence of a triggering event and an absence of sensitive personal information. Otherwise, the HTTP request is dropped and no response will be provided to a sender of the HTTP request. Other embodiments are disclosed.

20 Claims, 10 Drawing Sheets

(56) References Cited

U.S. PATENT DOCUMENTS

| | | | |
|---|---|---|---|
| 2010/0199345 A1* | 8/2010 | Nadir | H04L 63/14 726/22 |
| 2011/0321139 A1* | 12/2011 | Jayaraman | G06F 21/53 726/4 |
| 2012/0278889 A1* | 11/2012 | El-Moussa | H04L 63/1475 726/23 |
| 2013/0067215 A1* | 3/2013 | Derby | H04L 63/029 713/153 |
| 2013/0312081 A1* | 11/2013 | Shim | H04L 63/0236 726/13 |
| 2015/0058992 A1* | 2/2015 | El-Moussa | H04L 63/1416 726/24 |
| 2016/0308835 A1* | 10/2016 | Gluck | H04L 63/0245 |
| 2016/0308895 A1* | 10/2016 | Kotler | G06F 21/577 |
| 2017/0195353 A1* | 7/2017 | Taylor | H04L 43/08 |
| 2017/0244737 A1* | 8/2017 | Kuperman | G06N 3/084 |
| 2017/0339165 A1* | 11/2017 | Be'Ery et al. | H04L 63/1408 |
| 2018/0115595 A1* | 4/2018 | Krishnan | H04L 67/025 |
| 2019/0075122 A1* | 3/2019 | Ardeli | H04L 63/101 |
| 2019/0238576 A1* | 8/2019 | Weber | H04L 61/4511 |
| 2019/0334940 A1* | 10/2019 | Bar Noy | G06F 16/2379 |
| 2019/0394216 A1* | 12/2019 | Kondamuri | H04L 63/1416 |
| 2020/0137097 A1* | 4/2020 | Zimmermann | H04L 63/1425 |
| 2020/0213359 A1* | 7/2020 | Arbel | H04L 63/20 |
| 2020/0236117 A1* | 7/2020 | Zingerman | H04L 63/0245 |
| 2020/0404007 A1* | 12/2020 | Singh | G06F 16/24537 |
| 2021/0036991 A1* | 2/2021 | Owens | H04L 63/126 |
| 2021/0075766 A1* | 3/2021 | Kane | H04L 63/0281 |
| 2021/0081521 A1* | 3/2021 | Deng | G06F 21/31 |
| 2021/0367967 A1* | 11/2021 | Ma | H04L 63/1416 |
| 2022/0124102 A1* | 4/2022 | Zhang | H04L 63/101 |
| 2023/0114298 A1* | 4/2023 | Gupta | H04L 63/145 726/22 |
| 2023/0135755 A1* | 5/2023 | Nakar | H04L 63/1441 726/11 |
| 2023/0144836 A1* | 5/2023 | Nakar | H04L 63/1416 726/13 |
| 2023/0262077 A1* | 8/2023 | Palmer | H04L 63/1441 726/13 |
| 2024/0022594 A1* | 1/2024 | Mulugeta | H04L 63/168 |
| 2024/0406141 A1* | 12/2024 | Radovnikovic | H04L 63/0245 |

OTHER PUBLICATIONS

Shaheed, Aref, and MHD Bassam Kurdy. "Web application firewall using machine learning and features engineering." Security and Communication Networks Jan. 2022 (2022): 5280158.*

Epp, Nico, et al. "Anomaly-based web application firewall using http-specific features and one-class svm." Workshop Regional de Segurança da Informação e de Sistemas Computacionais. 2017.*

Toprak, Sezer, and Ali Gökhan Yavuz. "Web application firewall based on anomaly detection using deep learning." Acta Infologica 6.2 (2022): 219-244.*

Díaz-Verdejo, Jesús E., et al. "A critical review of the techniques used for anomaly detection of HTTP-based attacks: taxonomy, limitations and open challenges." Computers & Security 124 (2023): 102997.*

Betarte, Gustavo, et al. "Improving web application firewalls through anomaly detection." 2018 17th IEEE International Conference on Machine Learning and Applications (ICMLA). IEEE, 2018.*

Liang, Jingxi, Wen Zhao, and Wei Ye. "Anomaly-based web attack detection: a deep learning approach." Proceedings of the 2017 VI International Conference on Network, Communication and Computing. 2017.*

* cited by examiner

ENTERPRISE APPLICATION SHIELD SYSTEMS AND METHODS

FIELD OF THE DISCLOSURE

The subject disclosure relates to enterprise application shield systems and methods for blocking improper or malicious requests directed to a target system or applications.

BACKGROUND

It is desirable and important to protect vulnerable and unpatched code in software applications from various forms of attacks and exploitation. For instance, the various forms of attacks and exploitation include both known and unknown cyber attacks such as a Zero-day attack, unsolicited sensitive personal information (SPI), resource draining annoyances such as web crawlers, etc. Conventional cyber security approaches may involve large sized, overly-complex, and expensive scanning and tracing tools. Moreover, conventional cyber security tools can be vulnerable to the attacks and exploitation. The conventional cyber security tools may be overly exposed to brute force attacks and use excessive analysis and tracing that can overwhelm computing resources. Third-party codes are frequently used and contained in the conventional cyber security tools, which may create additional security issues due to unknown or unreliable codes within the third-party codes. The conventional cyber security tools may be lacking capabilities of SPI detection and rejection or customized security scans in an on-the-fly manner.

BRIEF DESCRIPTION OF THE DRAWINGS

Reference will now be made to the accompanying drawings, which are not necessarily drawn to scale, and wherein.

DETAILED DESCRIPTION

Figure 1A:
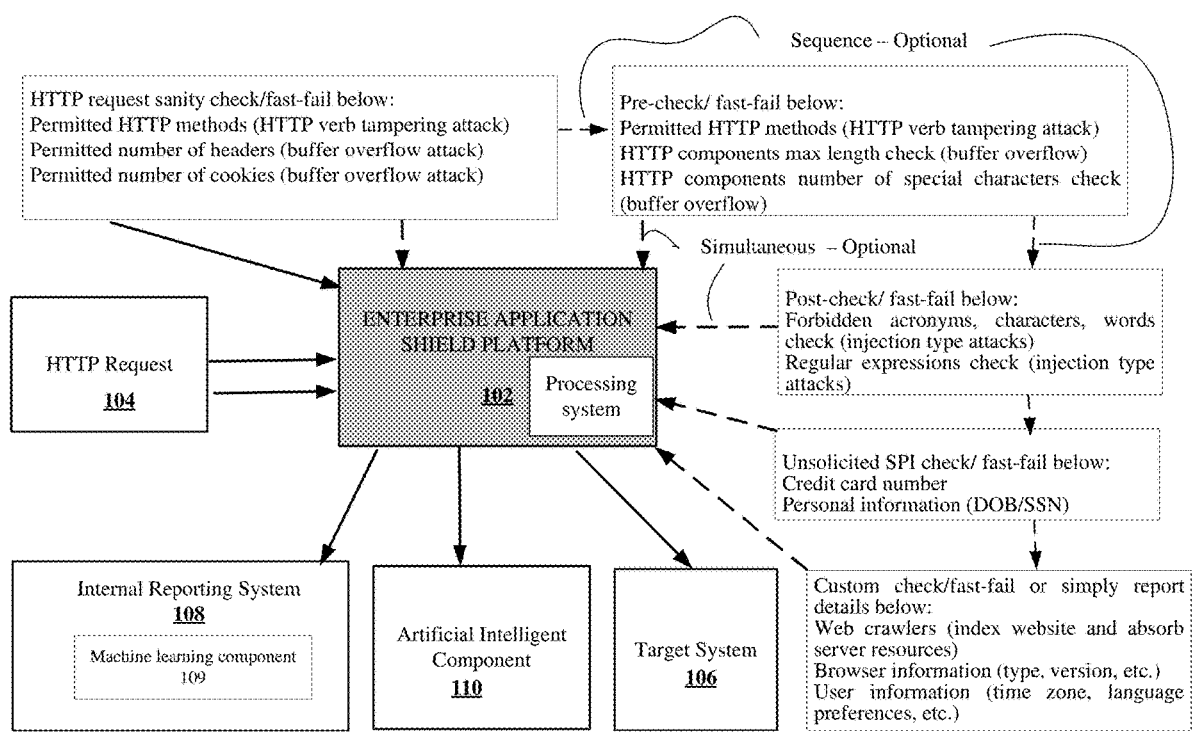
FIG. 1A is a block diagram illustrating an example, non-limiting embodiment of an enterprise application shield system in accordance with various aspects described herein.

The subject disclosure describes, among other things, illustrative embodiments for enterprise application shield systems and methods which perform a sequence of security checks as to an HTTP request and forward the HTTP request to a target system upon detection of no triggering event by performing the sequence of security checks. Otherwise, the HTTP request will be dropped and no response is provided to a sender of the HTTP request. Other embodiments are described in the subject disclosure.

The subject disclosure describes, among other things, illustrative embodiments for enterprise application shield systems and methods which can protect vulnerable unpatched software systems from both known and unknown cyber attacks, identify and reject sensitive personal information (SPI) to eliminate possibility of retention, and have the ability to customize the functionality for additional threats and annoyances. The enterprise Application shield systems and methods protect computer based systems and computer systems used and included in various technical fields, such as cellular communication networks.

One or more aspects of the subject disclosure are directed to a device including a processing system having a processor and a memory that stores executable instructions that, when executed by the processing system, facilitate performance of operations. The operations include receiving a Hypertext Transfer Protocol (HTTP) request; performing a sequence of security checks including one or more types of security checks; detecting a presence or an absence of a triggering event in the HTTP request, wherein the triggering event includes failing to pass the one or more types of security checks; upon detection of the presence of the triggering event, dropping the HTTP request and sending the dropped HTTP request to a reporting module; upon detection of the absence of the triggering event, detecting a presence of predetermined check data in the HTTP request; upon detection of the presence of the predetermined check data, rejecting the HTTP request; and upon detection of no predetermined check data, forwarding the HTTP request to a target system.

One or more aspects of the subject disclosure are directed to a non-transitory machine-readable medium, comprising executable instructions that, when executed by a processing system including a processor, facilitate performance of operations. The operations include receiving an HTTP request including a plurality of payloads; sequentially performing a series of fast-fail checks for the HTTP request; detecting a presence of a triggering event in the HTTP request, wherein the triggering event comprises failing to meet one of the series of fast-fail checks; upon detection of the presence of the triggering event, dropping the HTTP request; upon detection of no triggering event, sending the HTTP request to a target system; providing, to a reporting module, the dropped HTTP request; and providing, to an artificial intelligence module, the dropped HTTP request.

One or more aspects of the subject disclosure are directed to a method including steps of receiving, by a processing system including a processor, a HTTP request; performing, by the processing system, a sequence of security checks including one or more types of security checks; detecting, by the processing system, a presence of one or more anomalies associated with the HTTP request via the sequence of security checks; upon detection of the presence of the one or more anomalies, dropping, by the processing system, the HTTP request and sending the dropped HTTP request to a reporting module; upon detection of no anomaly and upon detection of a presence of sensitive personal information, sending, by the processing system, the HTTP request to the reporting module; and upon detection of no anomaly and no sensitive personal information, forwarding, by the processing system, the HTTP request to a target system.

FIG. 1A is a block diagram illustrating an example, non-limiting embodiment of an enterprise application shield system 100 in accordance with various aspects described herein. The enterprise application shield system 100 operates to protect a computing infrastructure at a company or an enterprise or a business including all computers, servers, etc. The enterprise application shield system 100 operates to shield or block incoming cyber attacks and protect internal systems such as a target system 106 including applications within the enterprise that can be potentially exploited by cyber attackers or malicious actors. The target system 106 can be potentially vulnerable by utilizing outdated or exploitable third party JAR files, containing insecure codes, having outdated container software, etc.

In various embodiments, the enterprise application shield system 100 includes an enterprise application shield platform 102 that receives an incoming HTTP (Hypertext Transfer Protocol) request 104. HTTP (Hypertext Transfer Protocol) operates as a request and a response protocol between a client and a server. For instance, a client, which is a browser of a computer, sends an HTTP request to the server and the server returns a response to the client. An HTTP request contains several elements including a request line, a series of HTTP headers, or header fields, and a message body if needed. The response to the HTTP request includes status information about the request and content requested by the client. HTTP request methods include GET, POST, PUT, PATCH, and DELETE. The GET method retrieves information from the server using a particular URI (Uniform Resource Identifier). The POST method sends data to the server using HTML (Hyper Text Markup Language) forms. The PUT method replaces all of the current representations of a requested resource with the updated content. The DELETE method removes the requested resources using the URI.

As described above, an HTTP request contains several elements including a request line, a series of HTTP headers, or header fields, and a message body if needed. The request line or start line starts the action on the server and includes an HTTP method, a request target identified with an URI (for a specific page), or an URL (Uniform Resource Locator) which contains information as to how to access the resource. The request line further includes an HTTP version that defines the structure of a message. The headers include additional information such as cookies, an authorization token, user agent information such as a browser and operating systems.

In some embodiments, HTTP requests may not provide a secure connection between clients and servers. HTTPS is an extension of the HTTP requests that secures request protocols by using bidirectional encryption using server-side digital certificates called SSL. The SSL certificates are issued by a trustworthy independent third party that will authenticate transactions between the server and the client.

A HTTP message payload (information or content) is an information part of the data that is sent in a message body prior to application of transfer encoding. In other words, if transfer encoding may not be used, the payload body is identical to the message body. RESTful API is an interface that two computer systems use to exchange information securely over the internet. Most business applications have to communicate with other internal and third-party applications to perform various tasks. An Application Programming Interface (API) is a way for two computers to communicate with each other over the web. An API that follows the REST standard is called RESTful. The format of a RESTful API has three main components: 1) URL endpoint; 2) HTTP verb; and 3) Body.

URL endpoint is a URL link that represents resources a client desires to access. Resources can be text, images, documents or any data entry. For example, example-.com/forms allows the client to view or create form templates.

HTTP verb requests a server what the client intends to do with the URL endpoint resource. For example, a POST request means creating a new form template and a GET request means viewing an existing form template.

Body message is an optional custom payload which contains a message with properties and values the client desires to use to create or update a given resource.

In various embodiments, the enterprise application shield platform 102 is configured to have an HTTP request centric structure. In some embodiments, the enterprise application shield platform 102 treats every HTTP request component as potential cyber attack payload. Incoming HTTP requests are funneled through a central point, which is the enterprise application shield platform 102, and there will be no end-run around a secure HTTP request perimeter. The enterprise application shield platform 102 operates to prevent various attacks and compromises to HTTP requests. For instance, the enterprise application shield platform 102 operates to block HTTP verb tampering attack by detecting and dropping unused or unimplemented application HTTP request methods. The enterprise application shield platform 102 allows or implements proper HTTP request methods to continue to client applications.

In various embodiments, the enterprise application shield platform 102 is further configured to prevent Denial-of-Service (DOS) type attacks/buffer overflow type attacks via fast fail checks if a number of HTTP request headers is excessive. The DOS type attacks result from sending a large amount of traffic to a network resource that exceeds the processing capacity. Buffer overflow is a common type of the DoS attack. Buffers are memory storage regions that hold data temporarily during transit and buffer overflow occurs when a data volume exceeds a storage capacity of a memory buffer. In some embodiments, a threshold that defines an excessive number of HTTP request headers is configurable. The enterprise application shield platform 102 utilizes and implements a precheck fast-fail approach which includes, for example, scanning or checking a total maximum length/count of special characters in HTTP requests and failure to pass the precheck will result in a termination of any progress of the HTTP requests. Therefore, wasting resources on additional checks can be prevented.

The enterprise application shield platform 102 does not permit or provide any response to suspicious, improper or malicious HTTP requests and further prevents any possibility of facilitating or assisting cyber attackers to obtain information or data via default HTTP responses or replies. In other words, the enterprise application shield platform 102 provides no response and completely shuts down cyber attackers.

Additionally, the enterprise application shield platform 102 utilizes post check concept as additional checks if a precheck scan passes. The enterprise application shield platform 102 can stream cyber attacker details (e.g., IP, etc.) to artificial intelligence applications that can block future attacks. By way of example, the enterprise application shield platform 102 includes regular expression checks of individual HTTP components (e.g., headers).

In various embodiments, the enterprise application shield platform 102 is highly configurable for each individual HTTP component such Uniform Resource Indicator (URI), query strings, headers, and body. The enterprise application shield platform 102 has flexible implementation, thereby capable of being implemented as JAR (Java Archive) files, WAR (Web Application Archive) files, or potentially an HTTP extension/wrapper. JAR files package multiple files in order to use the packaged files as a library, a plugin, etc. WAR files are used only for web applications. A WAR file is a packaged web application and can be used to import a web application into a web server. The enterprise application shield platform 102 is implemented with a simple design, easy to maintain, and cost effective. By way of example only, the enterprise application shield platform 102 is built with Java as a whole, thereby using or containing no potentially vulnerable unknown or unqualified third-party artifacts. The enterprise application shield platform 102 may have extremely small size artifact such as war size, by way of example only, 0.135 mg, and be extremely light-weight, e.g., written in Java in its entirety which is free from the third party vulnerabilities.

Additionally, or alternatively, the enterprise application shield platform 102 can perform sensitive personal information (SPI) detection and rejection in an HTTP request to prevent accidental SPI storage in the target system 106 or any other systems. The enterprise application shield platform 102 can identify credit card numbers, social security numbers, a date of birth, etc. The enterprise application shield platform 102 is configurable and customizable to define security checks and scans as needed. The enterprise application shield platform 102 is further configured and customized to define necessary actions such as reporting, blocking or both. The enterprise application shield platform 102 can prevent not only known and evolving cyber threats, but also reject unsolicited sensitive personal information (SPI) from retention which may result in potential legal liability. The enterprise application shield platform 102 is further highly configurable for custom scans. The enterprise application platform 102 does not interfere with Transport Layer Security (TLS) encryption by determining via header examination from an HTTP request, for example, a minimum version not being used. TLS encryption ensures data sent over the internet to be viewable by hackers or unauthorized actors, particularly for private and sensitive information such as passwords, credit card numbers, personal correspondence, etc.

In some embodiments, the enterprise application shield platform 102 improves conventional scanning and/or tracing tools because of a small, fast, easily deployable component. By way of example, the enterprise application shield platform 102 include a Java component in its entirety. The enterprise application shield platform 102 implements bundled functions of checking and filtering cyber threat, SPI, and customized HTTP request formality check, prechecks and post checks.

In some embodiments, during initial implementation of the enterprise application shield platform 102, data will be collected and fed to an internal reporting tools 108, for the purposes of analyzing trends. The internal reporting tools 108 may utilize machine learning techniques to execute certain tasks (e.g. blocking an attacker's IP), after training a machine learning component with attack experience.

Figure 1B:
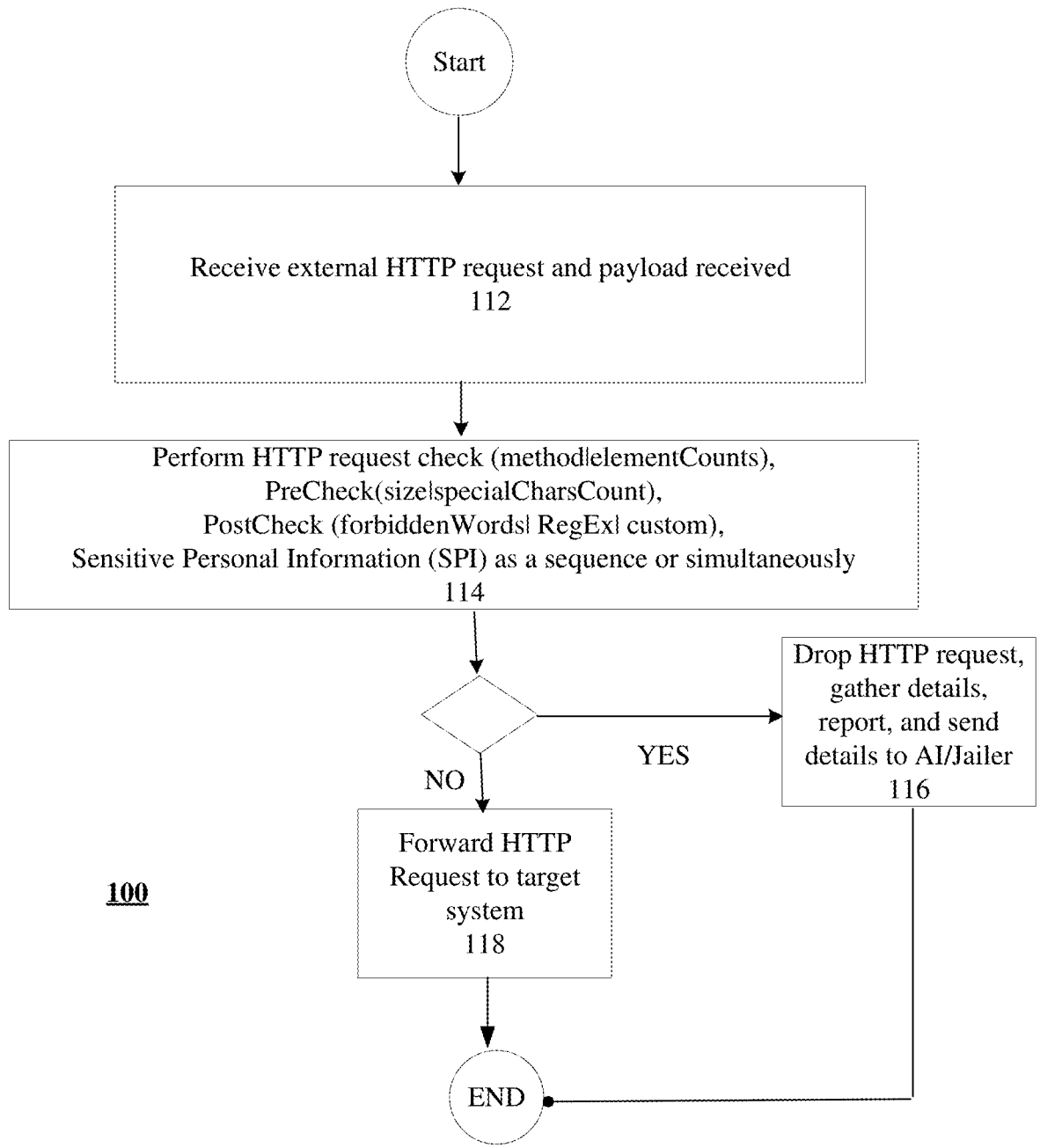
FIG. 1B is a block diagram illustrating an example, non-limiting embodiment of operations by the enterprise application shield system of FIG. 1A in accordance with various aspects described herein.

In various embodiments, the enterprise application shield platform 102 includes a processing system including a processor and a memory that stores executable instructions that, when executed by the processing system, facilitate performance of operations that scans or checks or filters an incoming HTTP request and determining a corresponding action. FIG. 1B depicts a block diagram illustrating an example, non-limiting embodiment of operations by the enterprise application shield system of FIG. 1A in accordance with various aspects described herein. As depicted in FIG. 1B, the enterprise application shield platform 102 receives the HTTP request 104 including a payload (Act 112). For instance, the HTTP request 104 may be sent by a browser of a cyber attacker who intends to delete some information from a target system 106 of a certain enterprise or company. The cyber attacker constructs the HTTP request 104 for that purpose and adds special characters such as a dollar sign ($), curly braces ({ }), etc. and a command that the cyber attacker desires to execute.

In some embodiments, upon receiving the HTTP request 104, the enterprise application shield platform 102 performs a sequence of security check including one or more types of security checks. For instance, the sequence of security check includes an HTTP check, a precheck, and post checks (Act 114). In some embodiments, the HTTP check, the precheck and post checks are sequentially performed. In other embodiments, the HTTP check, the precheck and post checks can be performed simultaneously. The enterprise application shield platform 102 is implemented with a multithreaded architecture which facilitate simultaneous performance of several security checks.

In Act 114, as a first check, the HTTP request check is implemented to scan an HTTP method, element counts included in the HTTP request 104. In other words, the HTTP request check can be regarded as a preliminary check or a quick sanity check. If the HTTP method that is incoming is a legitimate method, the HTTP request passes the HTTP request check and moves to the precheck. For instance, when the enterprise application shield platform 102 expects a "GET" method in the HTTP request 104, the HTTP request 104 having a "DELETE" method has been received. In that case, the HTTP request 104 having the "DELETE" method does not pass the HTTP request check and does not move onto a next round of checks.

In some embodiments, the cyber attacker constructs an HTTP request and adds one or more cookies. In some cases, the cyber attacker can include a large number of cookies such as 100 cookies or 300 cookies because the cyber attacker intends to overrun, overflow, damage or destroy the target system 106. The HTTP request check scans a count of elements and upon detection of a large number of elements (e.g., 300 cookies), such HTTP request does not pass the HTTP request check.

Once the HTTP request 104 passes the HTTP request check, the HTTP request 104 is subject to a precheck as a second check which scans a size, a presence of special characters count, etc. in the HTTP request (Act 114). For example, the HTTP request 104 includes a simple header which is referred to as a user agent. The user agent may include browser information, operating system information, etc. By way of example only, a user agent header may be 5075 characters for a browser and an operating system. For an HTTP request including 500 characters or 800 characters, such an HTTP request can be considered as cyber attack. The special characters include a dollar sign, curly braces, etc. and a count of the special characters can be checked or scanned. For instance, the HTTP request including 100 curly braces may not pass the precheck sequence.

After the precheck, the HTTP request 104 is subject to and proceeds to post checks. In some embodiments, the post checks scan forbidden words, regular expression, some custom word patterns, a set of words that cyber attackers are expected to use from the HTTP request 104. For instance, cyber attackers can use coined terms, combinations of words, special characters, etc. that are not legitimate words, etc. Additionally or alternatively, the post checks scan a special format, certain characters, numbers and symbols that are not allowed. In some embodiments, the post checks can be the last sequence of checking the HTTP request 104. In some embodiments, the sensitive personal information (SPI) check can be detected via detecting credit card numbers, bank card numbers, regular expressions behind the scenes, etc. which are included in the HTTP request 104. The SPI check can be performed after the post checks are performed or simultaneously with the post checks.

In Act 114, the sequence of the HTTP request check, the precheck and the post check is an optimal way of scanning and checking the security issues and risks associated with the HTTP request check, but the present disclosure is not limited thereto. The enterprise or business or company may configure or customize criteria, standard, rules, logics, etc. for scanning or checking HTTP request based on their needs. For instance, banks, medical institutions, etc. may place higher priority to filter HTTP requests containing SPI information. As another example, companies may place higher priority to filter special character counts, size, etc. to avoid disruption or damage to internal systems.

As depicted in FIG. 1B, upon passing the sequence of checks, the enterprise application shield platform 102 forwards the HTTP request 104 to the target system (Act 118). However, if the HTTP request 104 does not pass any check in the sequence, the HTTP request 104 will be completely dropped (Act 116). When the HTTP request 104 does not pass the sequence of checks in Act 114, the HTTP request 104 is dropped and no response is sent or provided. In other words, the HTTP request 104 is simply dropped and rejected by the enterprise application shield platform 102. An enterprise or company may not be able to obtain or retain the SPI information and avoid implication of legal implications stemming from the SPI information.

Referring back to FIG. 1A, the enterprise application shield platform 102 gathers some or detailed information about the dropped HTTP request and sends such information to an Artificial Intelligent (AI) component 110. The AI component 110 analyzes and stores such information for training purposes. In some embodiments, machine learning techniques can be utilized from cyber attack experience data collected from the dropped HTTP requests. In some embodiments, the enterprise application shield platform 102 includes a machine learning model and can be trained by using the machine learning techniques based on training data sets collected and generated from the cyber attack experience data. A sender of the HTTP request 104 such as the cyber attacker will not receive any response from the enterprise application shield platform 102.

In some embodiments, the enterprise application shield platform 102 sends IP information of the dropped HTTP request to an internal reporting module 108. The internal reporting module 108 receives the IP information for a trend analysis. The HTTP request includes an IP address of a cyber attacker and based on analysis of the IP address, a corrective action can be taken and block the same cyber attacker. The internal report module 108 may include a machine learning component 109 that facilitates the analysis of the IP address, identifying or recognizing a pattern of cyber attacks, the trend analysis, etc. An enterprise or a company typically receive a large volume of cyber attack requests and the machine learning techniques can be resourceful to address the large volume of malicious requests.

Figure 1C:
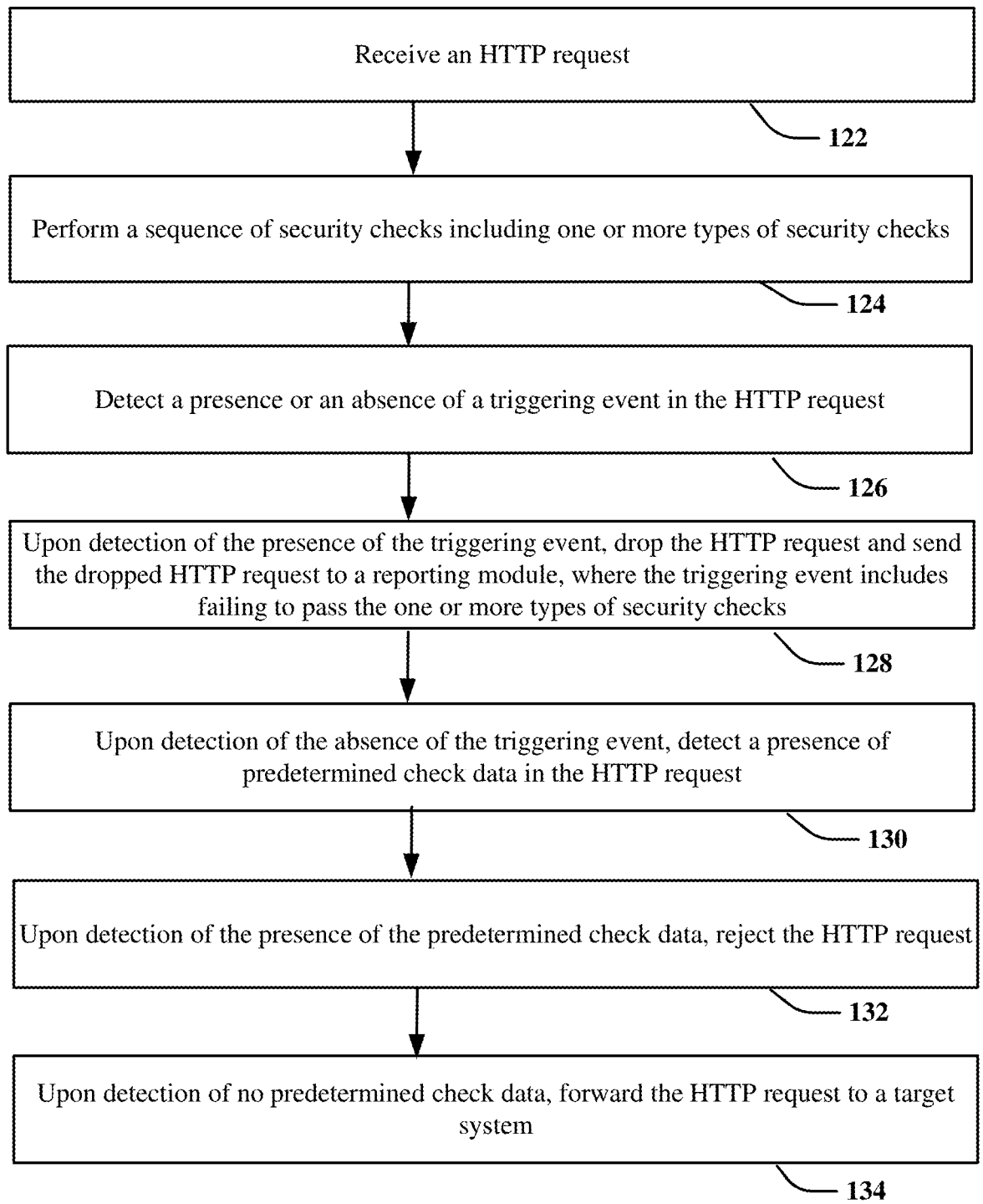
FIG. 1C depicts illustrative embodiment of a method in accordance with various aspects described herein.

FIG. 1C depicts illustrative embodiment of a method 120 in accordance with various aspects described herein. The method 120 includes receiving an HTTP request (Step 122), and performing a sequence of security checks including one or more types of security checks. In some embodiments, the one or more types of security checks includes a first type of security check configured to check an HTTP method, an excessive number of headers, an excessive number of cookies, or a combination thereof in the HTTP request. The one or more types of security checks further includes performing a second type of security check configured to check an excessive HTTP component maximum length check, an excessive HTTP component special character check, or a combination thereof in the HTTP request. Additionally or alternatively, the one or more types of security checks further includes a third type of security check configured to check forbidden acronyms, a regular expression check, or a combination thereof in the HTTP request. Additionally or alternatively, the one or more types of security checks further includes a fourth type of security check configured to check unsolicited sensitive personal information in the HTTP request. Alternatively, the fourth type of security check is configured to check a customized security check for checking web crawlers, browser information, user information, or a combination thereof. Additionally, or alternatively, the one or more types of security checks further includes the customized security check as a fifth type of security check.

In some embodiments, upon passing the second type of security check, assigning a first weight to the HTTP request, upon passing the third type of security check, assigning a second weight to the HTTP request, and upon passing the fourth type of security check, assigning a third weight to the HTTP request. The third weight is greater than the second weight which is greater than the first weight.

By way of example, the one or more types of security checks include an HTTP request check for checking an HTTP method, element counts such as a count of cookies, etc. included in the HTTP request. As another example, the one or more types of security checks further include pre-checks for checking a size such as a size of a user agent, a count of special characters (e.g., 300 $ characters, etc.). As further another example, the one or more types of security checks further include post checks for scanning forbidden words, regular expressions, coined terms, invalid combinations of characters, numbers, and special characters, a custom parameter or variable, etc. One or more types of security checks can be added, omitted, mixed, rearranged, or customized, as needed. By way of example, the sequence of security checks includes the HTTP request check, the pre-check, the post check, the SPI check, and any customer check.

Additionally or alternatively, the performing the sequence of security check further includes performing a first type of security check and upon passing of the first type of security check, proceeding to a second type of security check different from the first type of security check, and upon passing of the second type of security check, proceeding to a third type of security check. In some embodiments, different weights may be associated with a passing of each security check. For instance, upon passing the second type of security check, a first weight to the HTTP request is assigned, and upon passing the third type of security check, a second weight to the HTTP request is assigned.

As a result of performing the sequence of security checks, a presence or an absence of a triggering event is detected in the HTTP request (Step 126). The triggering event corresponds to failure to pass any of the one or more types of security checks. For instance, if the HTTP request includes a "DELETE" method, instead of a "GET" method, then the HTTP request will be dropped. The dropped HTTP request is sent to an internal reporting module (e.g., the internal reporting system 108 as depicted in FIG. 1 B). (Step 128).

Upon detection of an absence of the triggering event, i.e., the HTTP request passing the sequence of security checks, detection of a presence of predetermined check data in the HTTP request is further performed (Step 130). In some embodiments, the predetermined check data include sensitive personal information (SPI) by detecting and identifying credit card numbers, date of birth, etc. Upon detection of the presence of the predetermined check data, the HTTP request including SPI information will be rejected such that a retention of the SPI information can be avoided. (Step 132). Upon detection of the absence of the predetermined check data, the HTTP request is forwarded to a target system for further processes (Step 134). Upon passing of the sequence of security checks and upon detection of no SPI information, the HTTP request is determined as a valid input and sent to a target system (e.g., the target system 106 in FIG. 1A). Upon failing to pass any of the sequence of security check, any response to the HTTP request is forgone to be sent and the HTTP request will be dropped.

Figure 1D:
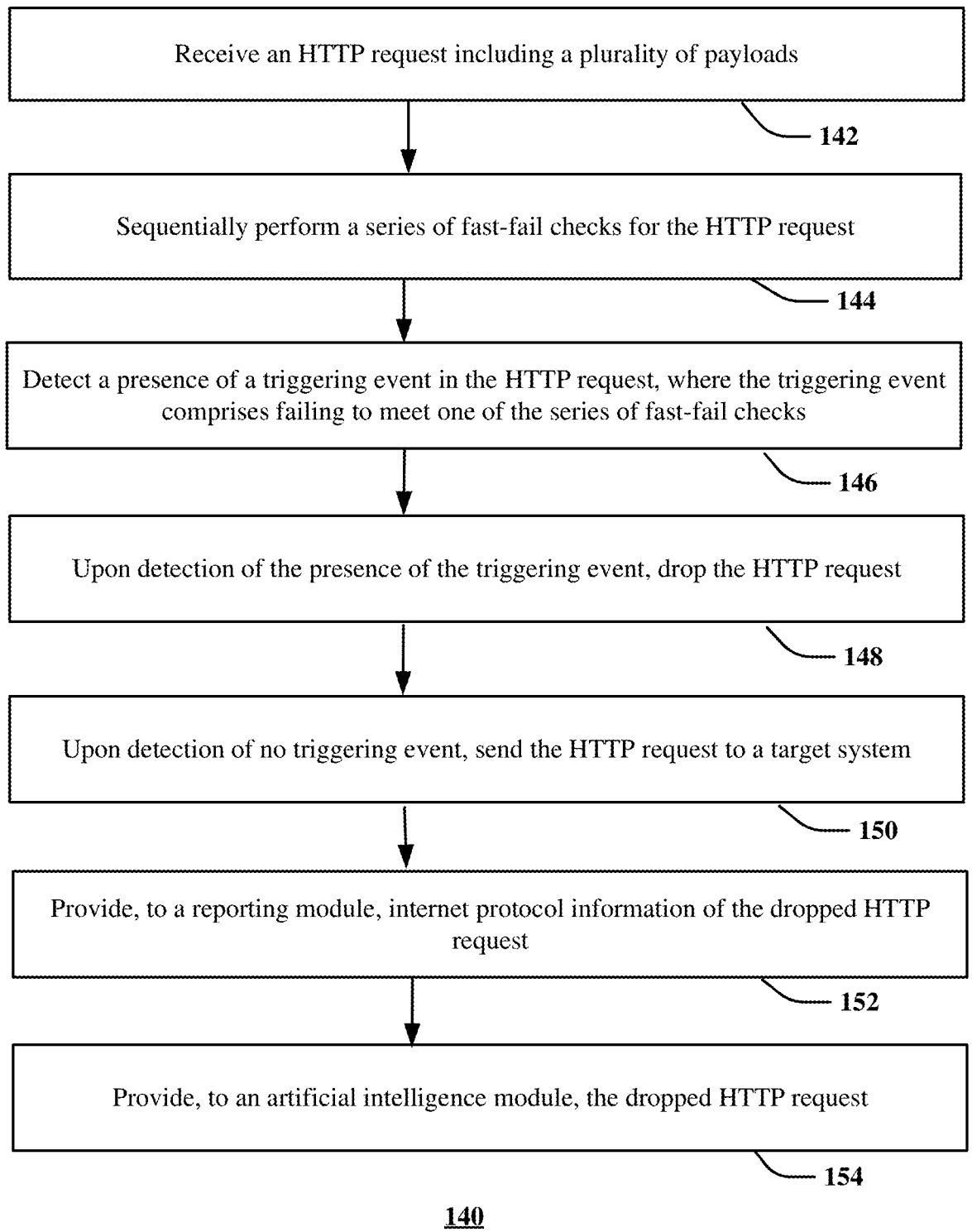
FIG. 1D depicts an illustrative embodiment of another method in accordance with various aspects described herein.

FIG. 1D depicts an illustrative embodiment of another method in accordance with various aspects described herein. The method 140 includes receiving an HTTP request having a plurality of payloads (Step 142). In some embodiments, the plurality of payloads includes a Universal Resource Identifier (URI), query strings, headers and a body. The method 140 further includes sequentially performing a series of fast-fail checks for the HTTP request (Step 144). The sequentially performing the series of fast-fail checks for the HTTP request includes checking the URI, the query strings, the headers, the body or a combination thereof with respect to predetermined criteria. Additionally, or alternatively, the sequentially performing the series of fast-fail checks for the HTTP request further includes checking a presence or an absence of unsolicited sensitive personal information in the HTTP request.

The method 140 further includes detecting a presence of a triggering event in the HTTP request (Step 146). The triggering event includes failing to meet one of the series of fast-fail checks (Step 146). Upon detection of the presence of the triggering event, the HTTP request will be dropped (Step 148). Upon detection of no triggering event, the HTTP request will be sent to a target system (Step 150). The method 140 further includes providing the dropped HTTP request to a reporting module (Step 152). The method 400 also includes providing the dropped HTTP request to an artificial intelligence module (Step 154). As described above in connection with FIG. 1A, the reporting module and the artificial intelligence module utilize machine learning techniques to analyze IPs and information or data associated with the dropped HTTP requests and generate training data sets for further training.

Additionally, the method 140 further includes detecting a presence of predetermined check data in the HTTP request, for example, sensitive personal information (SPI) data. Additionally or alternatively, the method further includes performing a custom check including but not limited to web crawlers (e.g., index websites) that absorb server resources, browser information (type, version, etc.), user information (time zones, language experiences, etc.).

Figure 1E:
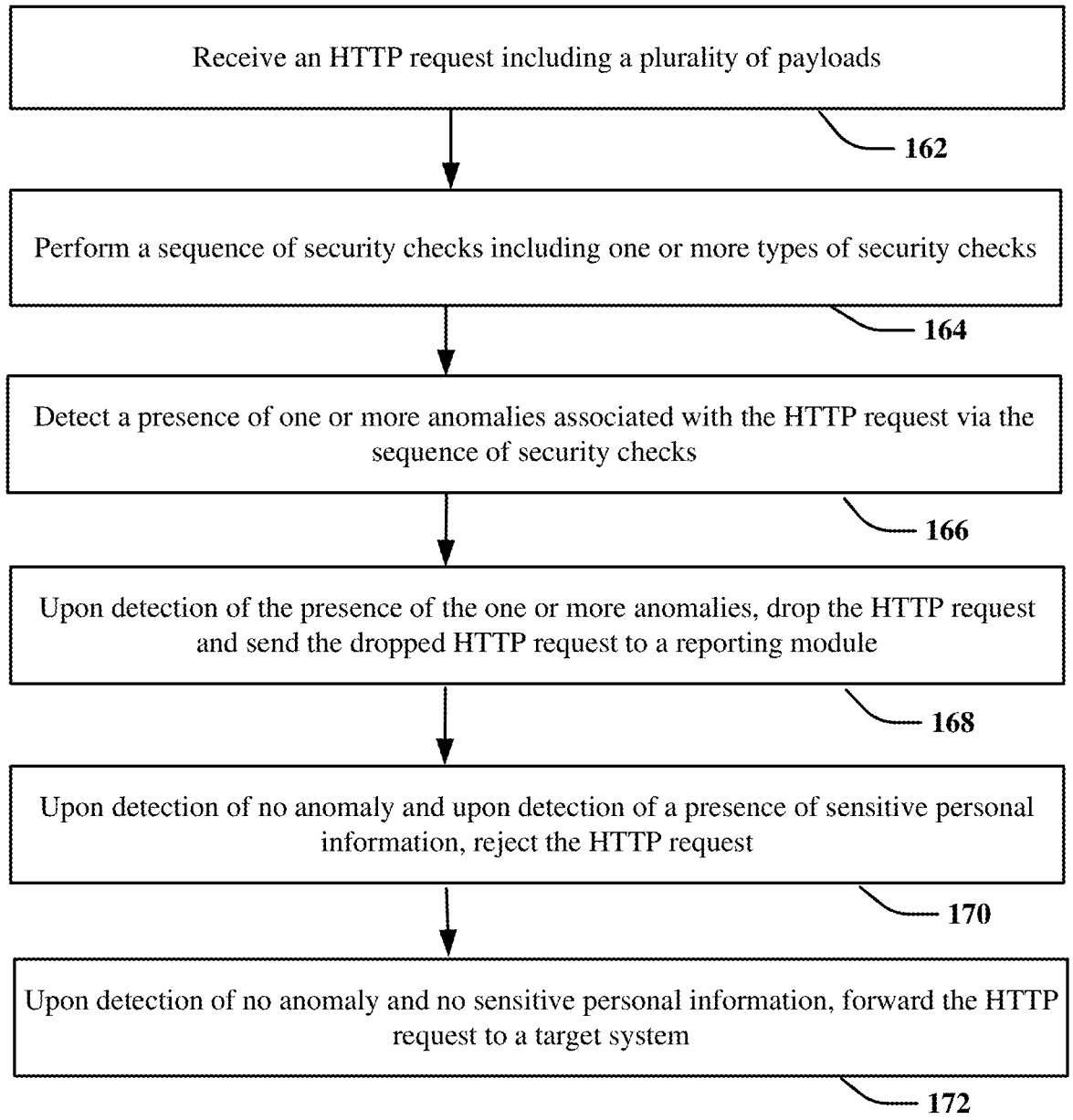
FIG. 1E depicts an illustrative embodiment of further another method in accordance with various aspects described herein.

FIG. 1E depicts an illustrative embodiment of another method 160 in accordance with various aspects described herein. The method 160 includes receiving an HTTP request having a plurality of payloads (Step 162). As described above, the plurality of payloads includes a Universal Resource Identifier (URI), query strings, headers and a body. The method 140 further includes performing a series of security checks for the HTTP request (Step 164). The series of security checks include one or more types of security checks (Step 164). The sequentially performing the series of fast-fail checks for the HTTP request includes checking the URI, the query strings, the headers, the body or a combination thereof with respect to predetermined criteria.

The method 160 further includes detecting a presence of one or more anomalies associated with the HTTP request via the sequence of security checks (Step 166). Upon detection of the presence of the one or more anomalies, the HTTP request will be dropped and sent to a reporting module (Step 168). Upon detection of no anomaly and upon detection of a presence of sensitive personal information, the HTTP request will be rejected such that no retention of such SPI information is possible (Step 170). Upon detection of no anomaly and no sensitive personal information, the HTTP request will be sent to a target system (Step 172). Additionally or alternatively, the method 160 further includes performing a custom check including but not limited to web crawlers (e.g., index websites) that absorb server resources, browser information (type, version, etc.), user information (time zones, language experiences, etc.).

While for purposes of simplicity of explanation, the respective processes are shown and described as a series of blocks in FIGS. 1C, 1D and 1E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2:
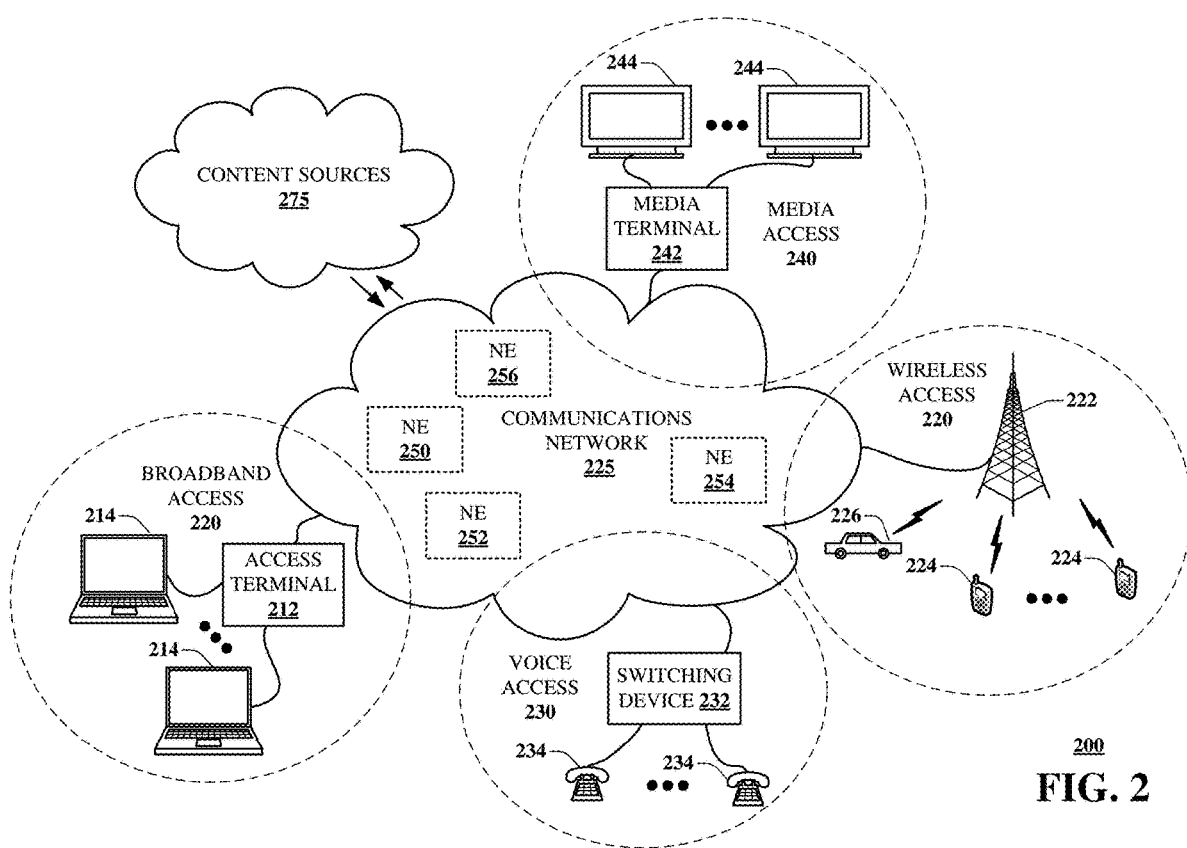
FIG. 2 is a block diagram illustrating an exemplary, non-limiting embodiment of a communications network in accordance with various aspects described herein.

Referring now to FIG. 2, a block diagram is shown illustrating an example, non-limiting embodiment of a system 200 in accordance with various aspects described herein. For example, system 200 can facilitate in whole or in part an enterprise application shield system for performing a sequence of security checks of an incoming HTTP request and filtering the HTTP request. In particular, a communications network 225 is presented for providing broadband access 210 to a plurality of data terminals 214 via access terminal 212, wireless access 220 to a plurality of mobile devices 224 and vehicle 226 via base station or access point 222, voice access 230 to a plurality of telephony devices 234, via switching device 232 and/or media access 240 to a plurality of audio/video display devices 244 via media terminal 242. In addition, communication network 225 is coupled to one or more content sources 275 of audio, video, graphics, text and/or other media. While broadband access 210, wireless access 220, voice access 230 and media access 240 are shown separately, one or more of these forms of access can be combined to provide multiple access services to a single client device (e.g., mobile devices 224 can receive media content via media terminal 242, data terminal 214 can be provided voice access via switching device 232, and so on).

The communications network 225 includes a plurality of network elements (NE) 250, 252, 254, 256, etc. for facilitating the broadband access 210, wireless access 220, voice access 230, media access 240 and/or the distribution of content from content sources 275. The communications network 225 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 212 can include a digital subscriber line access multiplexer (DSLAM), cable modem termination system (CMTS), optical line terminal (OLT) and/or other access terminal. The data terminals 214 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 222 can include a 4G, 5G, or higher generation base station, an access point that operates via an 802.11 standard such as 802.11n, 802.11ac or other wireless access terminal. The mobile devices 224 can include mobile phones, e-readers, tablets, phablets, wireless modems, and/or other mobile computing devices.

In various embodiments, the switching device 232 can include a private branch exchange or central office switch, a media services gateway, VoIP gateway or other gateway device and/or other switching device. The telephony devices 234 can include traditional telephones (with or without a terminal adapter), VoIP telephones and/or other telephony devices.

In various embodiments, the media terminal 242 can include a cable head-end or other TV head-end, a satellite receiver, gateway or other media terminal 242. The display devices 244 can include televisions with or without a set top box, personal computers and/or other display devices.

In various embodiments, the content sources 275 include broadcast television and radio sources, video on demand platforms and streaming video and audio services platforms, one or more content data networks, data servers, web servers and other content servers, and/or other sources of media.

In various embodiments, the communications network 225 can include wired, optical and/or wireless links and the network elements 250, 252, 254, 256, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 3:
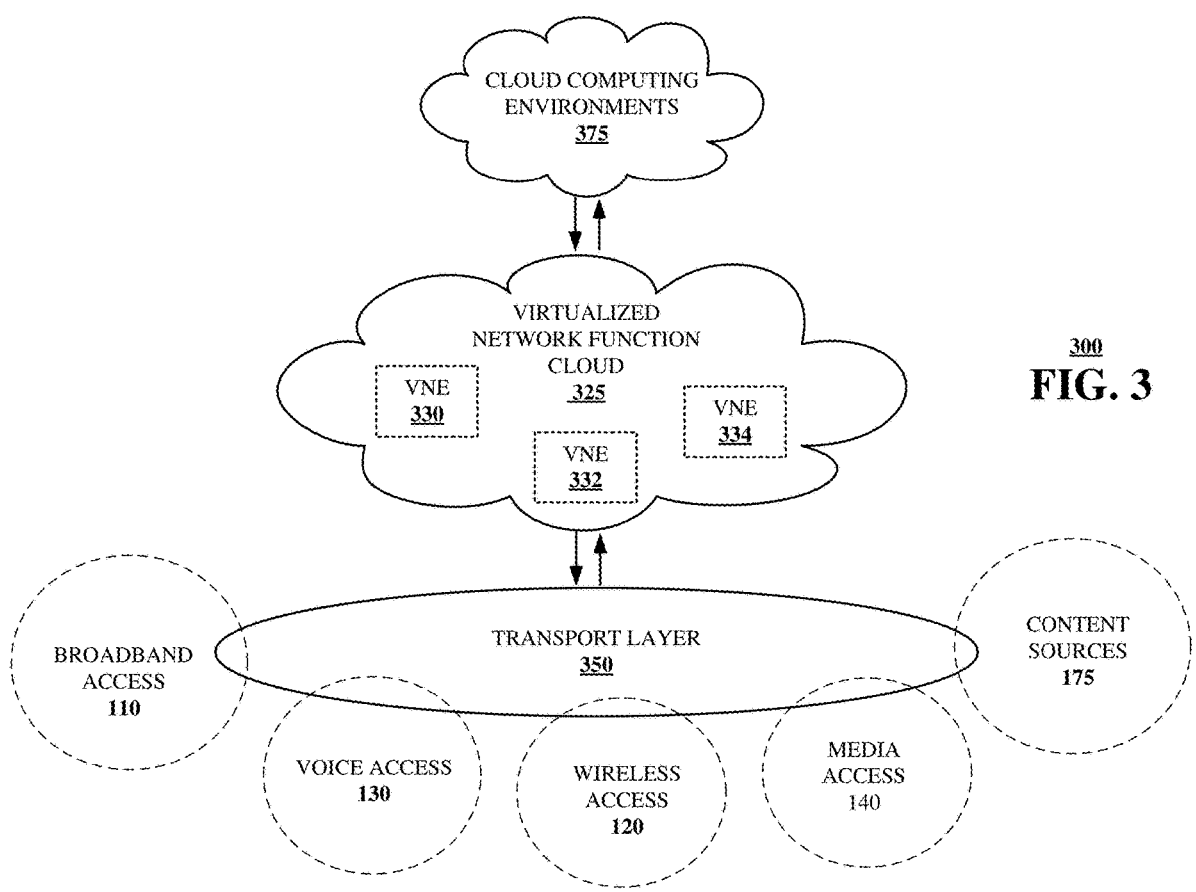
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 200, the subsystems and functions of system 200 presented in FIG. 2. For example, virtualized communication network 300 can facilitate in whole or in part an enterprise application shield system for performing a sequence of security checks of an incoming HTTP request and filtering the HTTP request.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 250, 252, 254, 256, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 250 (shown in FIG. 2), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 210, wireless access 220, voice access 230, media access 240 and/or access to content sources 275 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
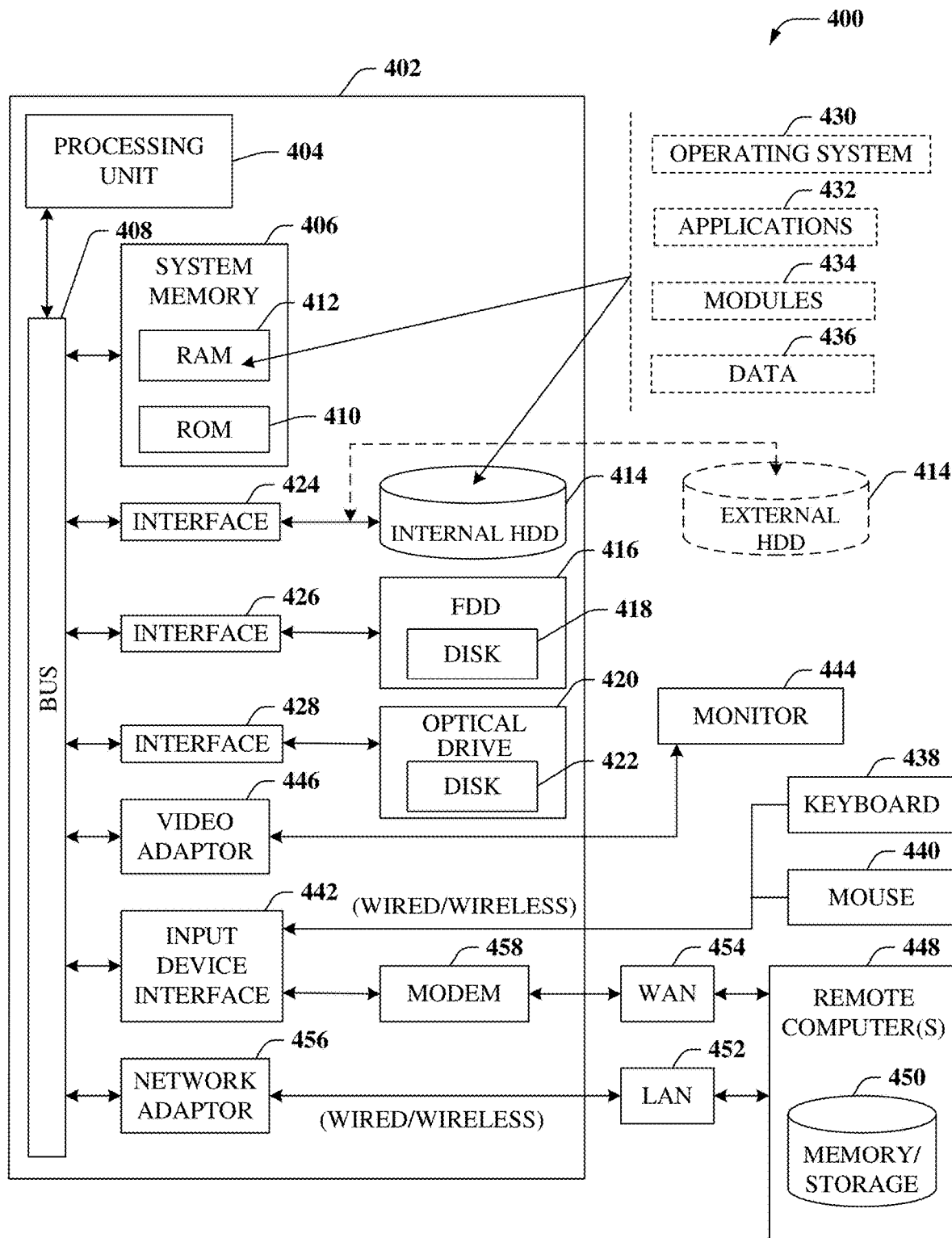
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 250, 252, 254, 256, access terminal 212, base station or access point 222, switching device 232, media terminal 242, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part an enterprise application shield system for performing a sequence of security checks of an incoming HTTP request and filtering the HTTP request.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
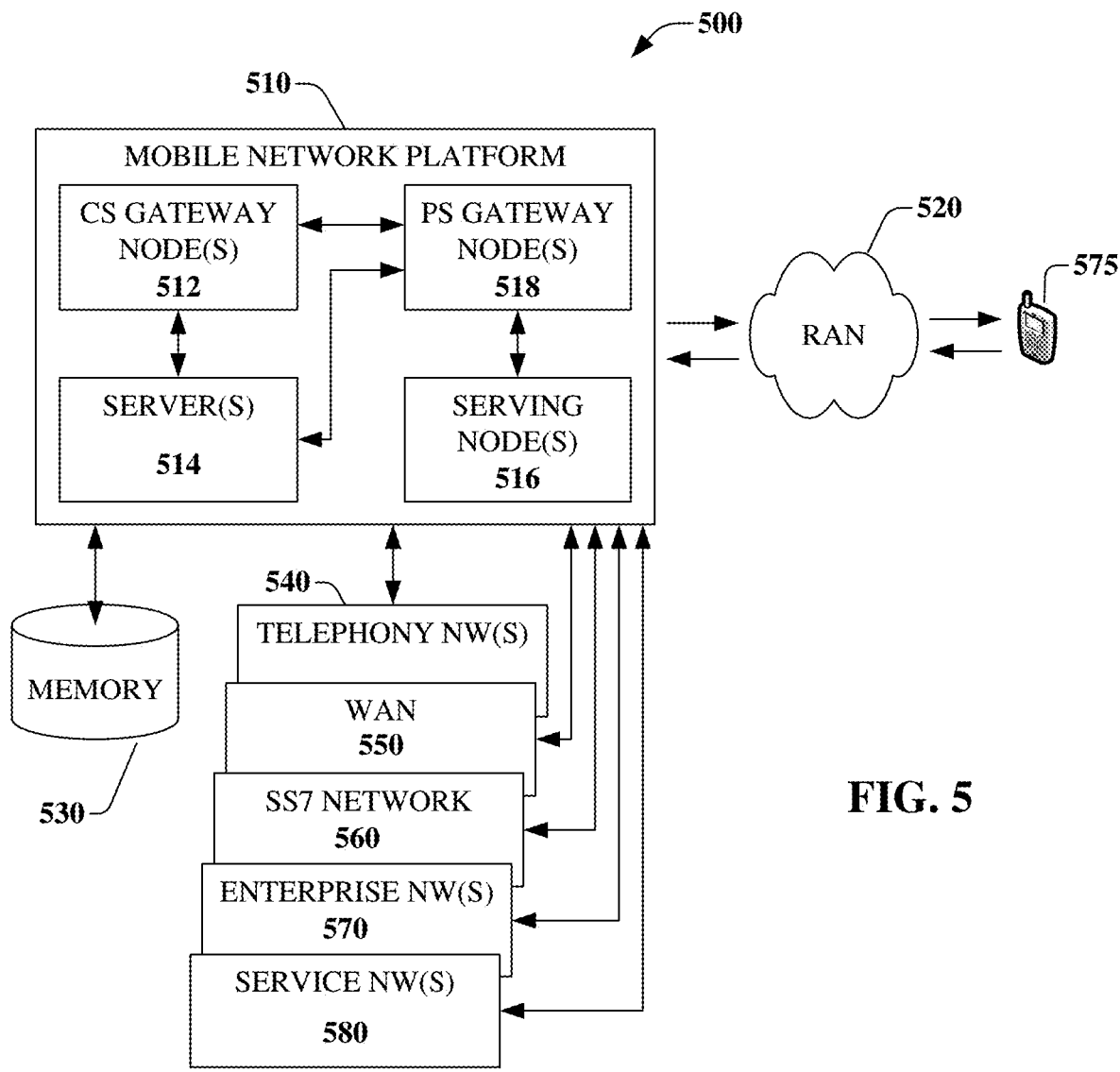
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 250, 252, 254, 256, and/or VNEs 330, 332, 334, etc. For example, platform 510 can facilitate in whole or in an enterprise application shield system for performing a sequence of security checks of an incoming HTTP request and filtering the HTTP request. In one or more embodiments, the mobile network platform 510 can generate and receive signals transmitted and received by base stations or access points such as base station or access point 222. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 2 that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
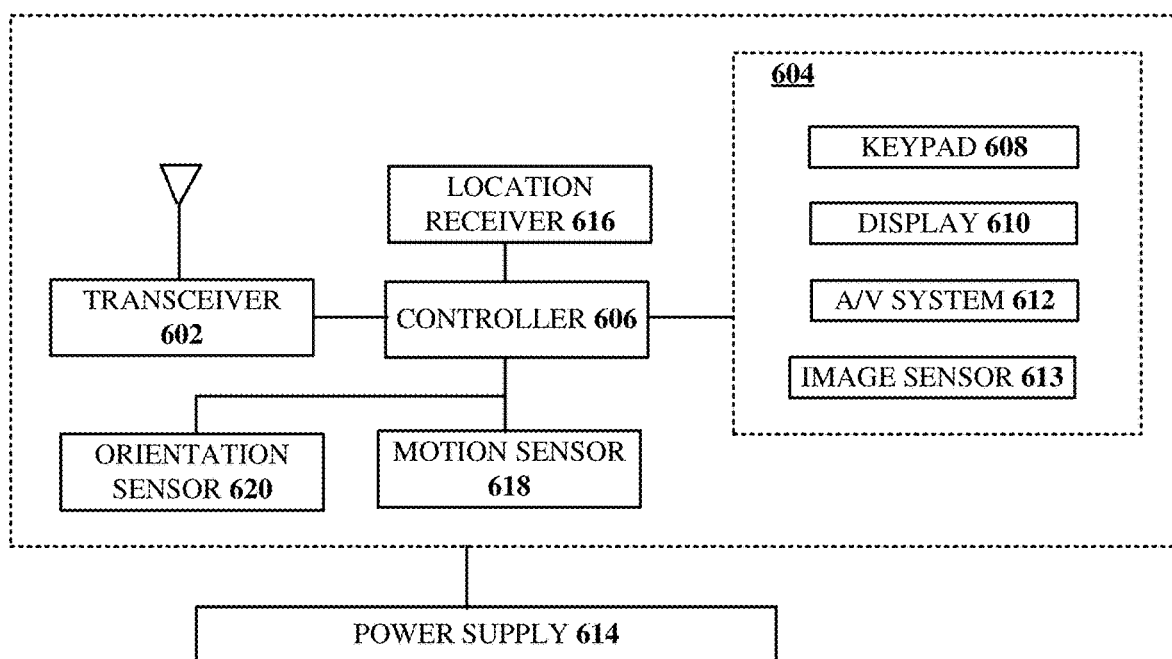
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 214, mobile devices 224, vehicle 226, display devices 244 or other client devices for communication via either communications network 225. For example, computing device 600 can facilitate in whole or in part an enterprise application shield system for performing a sequence of security checks of an incoming HTTP request and filtering the HTTP request.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving a Hypertext Transfer Protocol (HTTP) request;
performing a sequence of security checks including one or more types of security checks;
detecting a presence or an absence of a triggering event in the HTTP request, wherein the triggering event includes failing to pass the one or more types of security checks;
upon detection of the presence of the triggering event, dropping the HTTP request and sending the dropped HTTP request to a reporting module;
upon detection of the absence of the triggering event, detecting a presence of predetermined check data in the HTTP request;
upon detection of the presence of the predetermined check data, rejecting the HTTP request; and
upon detection of no predetermined check data, forwarding the HTTP request to a target system.

2. The device of claim 1, wherein the one or more types of security checks further comprise a first type of security check configured to check an HTTP method, an excessive number of headers, an excessive number of cookies, or a combination thereof in the HTTP request.

3. The device of claim 1, wherein the one or more types of security checks further comprise a second type of security check configured to check an excessive HTTP component maximum length check, an excessive HTTP component special character check, or a combination thereof in the HTTP request.

4. The device of claim 1, wherein the one or more types of security checks further comprise a third type of security check configured to check forbidden acronyms, a regular expression, or a combination thereof in the HTTP request.

5. The device of claim 1, wherein the predetermined check data further comprise unsolicited sensitive personal information in the HTTP request.

6. The device of claim 1, wherein the one or more types of security checks further comprise a customized security check configured to check a web crawler, browser information, user information, or a combination thereof.

7. The device of claim 1, wherein the one or more types of security checks further comprise a first type of security check, a second type of security check and a third type of security check, and the performing the sequence of security checks further comprises:
performing a first type of security check and upon passing of the first type of security check, proceeding to a second type of security check different from the first type of security check;
upon passing of the second type of security check, proceeding to a third type of security check; and
upon passing of the third type of security check, proceeding to the detecting the presence of the predetermined check data.

8. The device of claim 1, wherein the operations further comprise forging to send a response to the dropped HTTP request and the rejected HTTP request.

9. The device of claim 7, wherein the operations further comprise:
upon passing of the third type of security check and upon detection of no predetermined check data, determining the HTTP request as a valid input and sending the HTTP request to the target system; and
upon failing to pass any of the sequence of security check, forgoing to send a response to the HTTP request.

10. The device of claim 7, wherein the operations further comprise:
upon passing the second type of security check, assigning a first weight to the HTTP request; and
upon passing the third type of security check, assigning a second weight to the HTTP request.

11. A non-transitory machine-readable medium, comprising executable instructions that, when executed by a processing system including a processor, facilitate performance of operations, the operations comprising:
receiving an HTTP request including a plurality of payloads;
sequentially performing a series of fast-fail checks for the HTTP request;
detecting a presence of a triggering event in the HTTP request, wherein the triggering event comprises failing to meet one of the series of fast-fail checks;
upon detection of the presence of the triggering event, dropping the HTTP request;
upon detection of no triggering event, sending the HTTP request to a target system;
providing, to a reporting module, internet protocol information of the dropped HTTP request; and
providing, to an artificial intelligence module, the dropped HTTP request.

12. The non-transitory machine-readable medium of claim 11, wherein the operations further comprise detecting a presence of predetermined check data in the HTTP request.

13. The non-transitory machine-readable medium of claim 11, wherein the plurality of payloads further comprises a Universal Resource Identifier (URI), query strings, headers and a body; and
wherein the sequentially performing the series of fast-fail checks for the HTTP request further comprises checking the URI, the query strings, the headers, the body or a combination thereof with respect to predetermined criteria.

14. The non-transitory machine-readable medium of claim 12, wherein the predetermined check data further comprise unsolicited sensitive personal information in the HTTP request and the operations further comprise rejecting the HTTP request upon detection of a presence of the unsolicited sensitive personal information.

15. A method, comprising:
- receiving, by a processing system including a processor, a HTTP request;
- performing, by the processing system, a sequence of security checks including one or more types of security checks;
- detecting, by the processing system, a presence of one or more anomalies associated with the HTTP request via the sequence of security checks;
- upon detection of the presence of the one or more anomalies, dropping, by the processing system, the HTTP request and sending the dropped HTTP request to a reporting module;
- upon detection of no anomaly and upon detection of a presence of sensitive personal information, sending, by the processing system, the HTTP request to the reporting module; and
- upon detection of no anomaly and no sensitive personal information, forwarding, by the processing system, the HTTP request to a target system.

16. The method of claim 15, wherein the performing the sequence of security check further comprises:
- performing, by the processing system, a first type of security check configured to check an HTTP method, an excessive number of headers, an excessive number of cookies, or a combination thereof in the HTTP request;
- performing, by the processing system, a second type of security check configured to check an excessive HTTP component maximum length check, an excessive HTTP component special character check, or a combination thereof in the HTTP request; and
- performing, by the processing system, a third type of security check configured to check forbidden acronyms, a regular expression, or a combination thereof in the HTTP request.

17. The method of claim 16, wherein the performing the sequence of security check further comprises performing, by the processing system, a customized security check configured to check web crawlers, browser information, user information, or a combination thereof.

18. The method of claim 15, wherein the performing the sequence of security check further comprises:
- performing a first type of security check and upon passing of the first type of security check, proceeding, by the processing system, to a second type of security check different from the first type of security check;
- upon passing of the second type of security check, proceeding, by the processing system, to a third type of security check; and
- upon passing of the third type of security check, proceeding, by the processing system, to a fourth type of security check.

19. The method of claim 18, further comprising:
- upon passing of the fourth type of security check, determining, by the processing system, the HTTP request as a valid input and sending the HTTP request to the target system; and
- upon failing to pass any of the sequence of security check due to the one or more anomalies, forgoing to send a response to the HTTP request by the processing system.

20. The method of claim 18, further comprise comprising:
- upon passing the second type of security check, assigning, by the processing system, a first weight to the HTTP request;
- upon passing the third type of security check, assigning, by the processing system, a second weight to the HTTP request; and
- upon passing the fourth type of security check, assigning, by the processing system, a third weight to the HTTP request, wherein the third weight is greater than the second weight which is greater than the first weight.

* * * * *